United States Patent [19]
Iguchi et al.

[11] Patent Number: 5,401,939
[45] Date of Patent: * Mar. 28, 1995

[54] ELECTROMAGNETIC INDUCTION HEATER WITH MAGNETIC FLUX DIFFUSING MEMBERS

[75] Inventors: Atsushi Iguchi; Kuniaki Iguchi, both of Kyoto, Japan

[73] Assignee: Hidec Corporation Ltd., Kyoto, Japan

[*] Notice: The portion of the term of this patent subsequent to Sep. 13, 2011 has been disclaimed.

[21] Appl. No.: 249,976

[22] Filed: May 27, 1994

Related U.S. Application Data

[63] Continuation-in-part of Ser. No. 102,295, Aug. 5, 1993, Pat. No. 5,347,107.

[30] Foreign Application Priority Data

Sep. 3, 1992 [JP] Japan ................... 4-235917

[51] Int. Cl.⁶ .......................................... H05B 6/12
[52] U.S. Cl. ................... 219/624; 219/627; 219/670; 219/676; 219/671
[58] Field of Search ............... 219/624, 627, 670, 676, 219/667, 669, 656, 671

[56] References Cited

U.S. PATENT DOCUMENTS

| | | | |
|---|---|---|---|
| 4,110,588 | 4/1979 | Holz | 219/10.49 |
| 4,145,591 | 3/1979 | Takeda | 219/670 |
| 4,355,222 | 10/1982 | Geithman et al. | 219/633 |
| 4,442,332 | 4/1984 | Jackson et al. | 219/652 |
| 4,467,162 | 8/1984 | Kondo et al. | 219/624 |
| 4,468,549 | 8/1984 | Arnosky | 219/650 |
| 4,795,872 | 1/1989 | Hagisawa et al. | 219/670 |
| 4,798,926 | 1/1989 | Sakai | 219/10.43 |
| 4,999,467 | 3/1991 | Iguchi | 219/10.493 |
| 5,003,145 | 3/1991 | Nolle et al. | 219/647 |
| 5,053,593 | 10/1991 | Iguchi | 219/10.493 |
| 5,347,107 | 9/1994 | Iguchi et al. | 219/624 |

OTHER PUBLICATIONS

European Search Report, EP 93112364.0, Nov. 24, 1993.

*Primary Examiner*—Philip H. Leung
*Attorney, Agent, or Firm*—Fish & Richardson

[57] ABSTRACT

An electromagnetic induction heater in which magnetic flux diffusing members are fixed to at least two ends of an iron core wrapped with an electric wire to form a coil, and a metal plate is connected to the magnetic flux diffusing members to heat a wide area of the metal plate uniformly. By supplying a commercial low frequency alternating power source of 50–60 Hz to the coil, magnetic flux is generated in the iron core. The magnetic flux, flowing in the magnetic flux diffusing members, is diffused in a longitudinal direction. Diffused magnetic flux flows through the metallic plate to generate Joule heat over the plate. Therefore, the entire surface of the metal plate is heated uniformly. Either a single-phase or three-phase alternating power source is used in this invention.

20 Claims, 13 Drawing Sheets

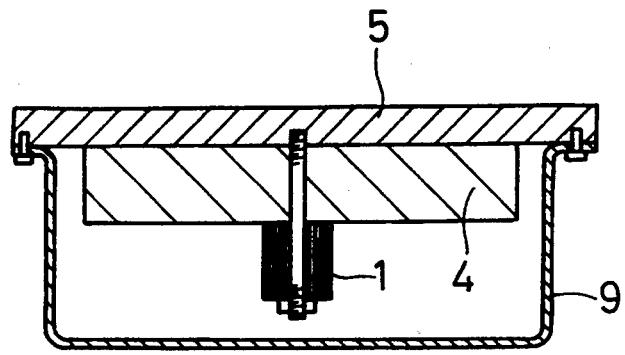
F I G. 5
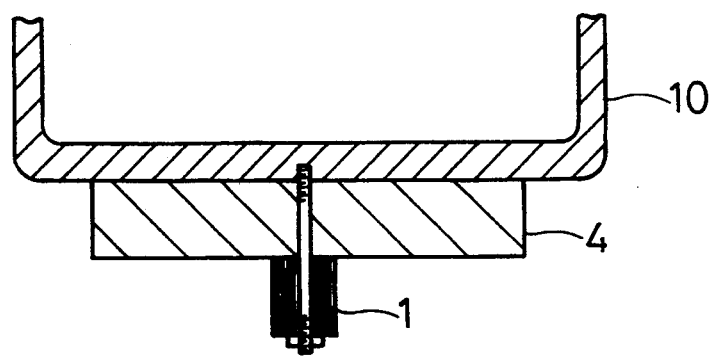
F I G. 6

ELECTROMAGNETIC INDUCTION HEATER WITH MAGNETIC FLUX DIFFUSING MEMBERS

This application is a continuation-in-part of U.S. application Ser. No. 08/102,295, filed Aug. 5, 1993, now U.S. Pat. No. 5,347,107.

FIELD OF THE INVENTION

This invention relates to an electromagnetic induction heater which operates with a low-frequency alternating current. More specifically, the invention relates to a low-frequency electromagnetic induction heater which can heat a wide area uniformly.

BACKGROUND OF THE INVENTION

Generally, electrical resistance heaters, fuel gases or the like are heat sources for heating iron cooking plates to cook steaks, grilled meat, okonomiyaki (meat and vegetable pancakes), pancakes, hot dogs, hamburgers or the like. However, the gas burning method causes gas and heat problems, particularly the danger of a possible gas explosion. Therefore, the gas burning method is not a preferred heating method for restaurants. Another problem caused by the gas burning method is low energy conversion efficiency (thermal efficiency); the conversion from gas to heat is only about 20–30% efficient. An additional problem is difficulty in controlling the temperature in the gas burning method. Temperature control is also difficult in electrical resistance heaters.

In order to solve the above-noted problems, an electromagnetic induction heater comprising six induction coils, positioned vertically and in a circular configuration and connected in a delta connection supplied with a low-frequency electric power source of 50 Hz or 60 Hz, has been disclosed in U.S. Pat. Nos. 4,999,467, 5,053,593, and European Patent Publication No. 0,380,030A1.

However, the inventions disclosed in U.S. Pat. Nos. 4,999,467, 5,053,593, and European Patent Publication No. 0,380,030A1 present the problem that only the central part of an iron cooking plate is heated directly by the coils and that the peripheral part of the iron cooking plate can be heated only by heat conduction. As a result, the electromagnetic induction heater of the above patents cannot heat a wide area uniformly.

SUMMARY OF THE INVENTION

It is an objective of this invention to provide an electromagnetic induction heater which operates with a low-frequency alternating current and heats a wide area uniformly, thereby solving the above problem.

In order to accomplish this objective, this invention includes an electromagnetic induction heater comprising an iron core of a transverse dimension $W_1$ and having a longitudinal axis, ends and a central part, said iron core being wrapped with an electric wire to form a coil around said core, said ends of said iron core each being fixed to elongated magnetic flux diffusing members having longitudinal axes disposed substantially perpendicularly to the longitudinal axis of said iron core, said magnetic flux diffusing members being connected to a metal plate and each having length $W_2$ which is greater than said transverse dimension $W_1$ of said iron core, wherein a magnetic flux flows through a closed magnetic circuit comprising said iron core, said magnetic flux diffusing members and said metal plates by connecting said electric wire to a low frequency alternating current power source, the magnetic flux being diffused by spreading from dimension $W_1$ to length $W_2$, so that said metal plate is heated by Joule heat, and wherein a ratio of said length $W_2$ to said transverse dimension $W_1$ is between 2 and 70. As a result, the magnetic flux is diffused by spreading from dimension ($W_1$) to dimension ($W_2$).

It is preferable in this invention that the ratio of the length $W_2$ to the transverse dimension $W_1$ is between 3 to 7.

It is preferable in this invention that the ratio of the length $W_2$ to the transverse dimension $W_1$ is 5.

It is preferable in this invention that the plurality of units, comprised of an iron core, coils and magnetic flux diffusing members, are arranged in a row, the iron cores are substantially parallel, and the units are attached to a metal plate.

It is preferable in this invention that the plurality of units, comprised of an iron core, coils and magnetic flux diffusing members are arranged vertically and attached to a metal plate.

It is preferable in this invention that the three units.

It is preferable in this invention that the coils of the units are connected to a three-phase power source.

It is preferable in this invention that the electric wire is an aluminum wire. As a result, the metal plate is heated by Joule heat. In this invention, the use of aluminum wires can improve the heat-resistance, and aluminum wires are also durable for a long period of time without causing any short-circuit accidents.

It is preferable in this invention that the metallic plate is an iron plate.

It is preferable in this invention that the iron core is made of flat-rolled silicon steel sheets or strips, or of an amorphous alloy.

It is preferable in this invention that the magnetic flux diffusing member is made of flat-rolled silicon steel sheets or strips, or of an amorphous alloy.

It is preferable in this invention that a temperature detector is disposed on the inside or the outside of the metallic plate.

It is preferable in this invention that the edges of the metal plate are bent into an L-shape and that the magnetic flux diffusing members are disposed on the bent edges.

It is preferable in this invention that a flux leakage absorbing member is disposed on the bottom of the metallic plate.

It is preferable in this invention that the flux leakage absorbing member is a short-circuit member made of an electrically conductive material.

It is preferable in this invention that the magnetic flux diffusing members are disposed at right angles to the iron core, thereby heating a wide area.

It is preferable in this invention that the metal plate is a flat plate, a concave plate, or a container.

It is preferable in this invention that the magnetic flux diffusing members are attached to both the center part and the ends of the iron core, thus diffusing a magnetic flux efficiently.

When using at least two coils around the iron core, a Scott connection can be assembled by employing a three-phase power source. As a result, electric power is consumed equally from each phase of the power source.

It is preferable in this invention that the connection of electric wires is a three-phase Scott connection. In the composition described above, the metal plate is heated by a single iron core. Thus, the cost of the apparatus of the invention is reduced.

It is preferable in the invention that the magnetic flux diffusing members are fixed to both ends and two central sections of the iron core, and that the iron core is formed with at least three coils around it. Also, three-phase electric power is preferably supplied to the electric wire of the coils so that electric power is consumed equally from each phase of the power source.

It is preferable in this invention that several units comprising of an iron core, coils and magnetic flux diffusing members are arranged in a row and that the iron cores are practically parallel. Furthermore, those units are attached to a metal plate. As a result, a wide area can be heated uniformly.

It is preferable in this invention that several units comprising an iron core, coils and magnetic flux diffusing members are arranged vertically, and that those units are attached to a metal plate.

It is preferable in this invention that there are three pieces of compound units and wires consisting of the units are connected to a three-phase power source. As a result, a three-phase power source electricity can be consumed equally and a wide area can be heated uniformly.

In order to accomplish this objective, this invention includes an electromagnetic induction heater comprising an elongated iron transverse dimension ($W_1$) and having ends and a central part. The iron core is wrapped with an aluminum wire to form a coil around the core The ends of the iron core are fixed to a plurality of elongated magnetic flux diffusing members which have a longitudinal dimension ($W_2$) greater than transverse dimension ($W_1$) of the iron core. The magnetic flux members are further connected to a metal plate. Thus, a magnetic flux flows through a closed magnetic circuit comprising the iron core, the magnetic flux diffusing members, and the metal plate by connecting the electric wire to a low frequency alternating current electric power source. The magnetic flux diffusing members having longitudinal axes are arranged at right angles to the longitudinal axis of the iron core. As a result, the magnetic flux is diffused by spreading from dimension ($W_1$) to dimension ($W_2$). Therefore, the metal plate is heated by Joule heat. In other words, the entire metal plate is heated uniformly.

Flat-rolled silicon steel sheets or strips, an amorphous alloy or the like can be used as the iron core of the invention. It is, however, preferable to use flat rolled silicon steel sheets or strips to reduce the cost of the the invention.

Flat rolled silicon steel sheets or strips, amorphous alloy or the like are used as the magnetic flux diffusing members. However, it is preferable to use the rolled silicon steel sheets or strips in order to reduce the cost of the invention.

By attaching the temperature detecting member inside or on the metal plate, the temperature of the metal plate can be accurately controlled.

The edges of the metal plate are bent into an L-shape, and the magnetic flux diffusing members are placed on the bent edges. As a result, there is less flux leakage and the assembly of the heater is simplified.

By fixing the flux leakage absorbing member to the bottom of the iron plate, the magnetic attraction of metallic knives, forks, spatulas or the like by the magnetic flux can be prevented.

When the flux leakage absorbing member is a short-circuit member made of an electrically conductive material, flux leakage can be controlled efficiently.

When the magnetic flux diffusing members are disposed at right angles to the iron core, a wide area of the iron plate can be heated.

In the composition described above in which the metal plate is a flat plate, a concave plate, or a container, the invention is applicable as a heating plate, heating pan, thermal heating cookware and other cookware.

BRIEF DESCRIPTION OF THE DRAWINGS

FIG. 5 shows a cross-sectional view of an electromagnetic induction heater of another embodiment of the invention in which a short-circuit member is disposed on the bottom of an iron plate in order to absorb flux leakage.

FIG. 6 shows a cross-sectional view of an electromagnetic induction heater of another embodiment of the invention in which a metal plate has a concave shape or is shaped like a container.

DETAILED DESCRIPTION OF THE INVENTION

Figure 1:
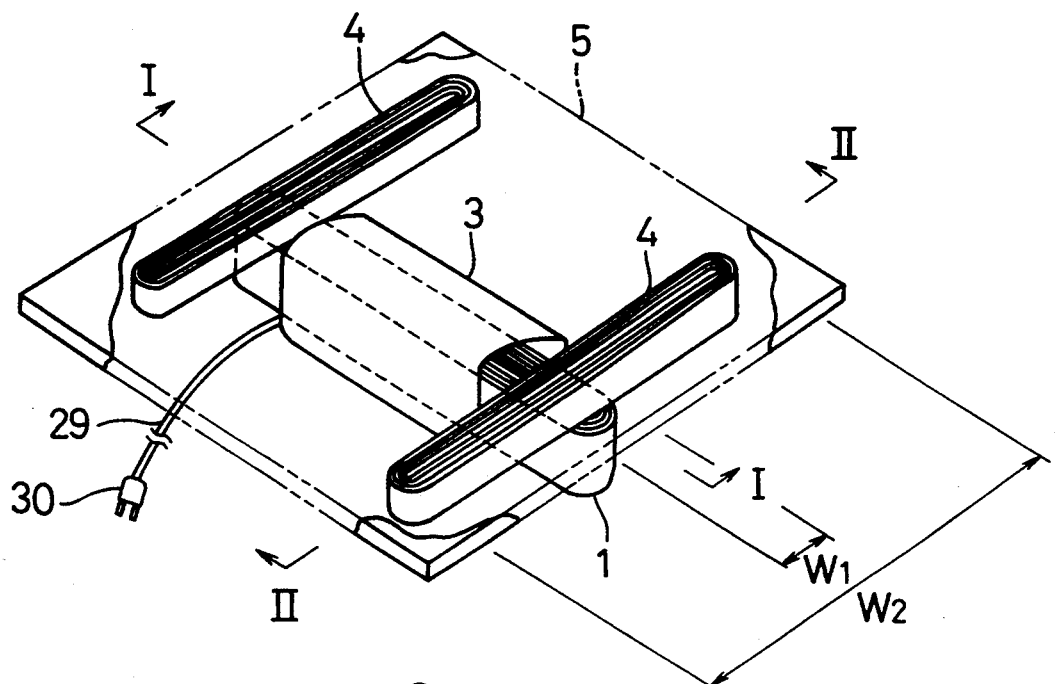
FIG. 1 shows a perspective view of an electromagnetic induction heater of an embodiment of the invention.
Figure 2:
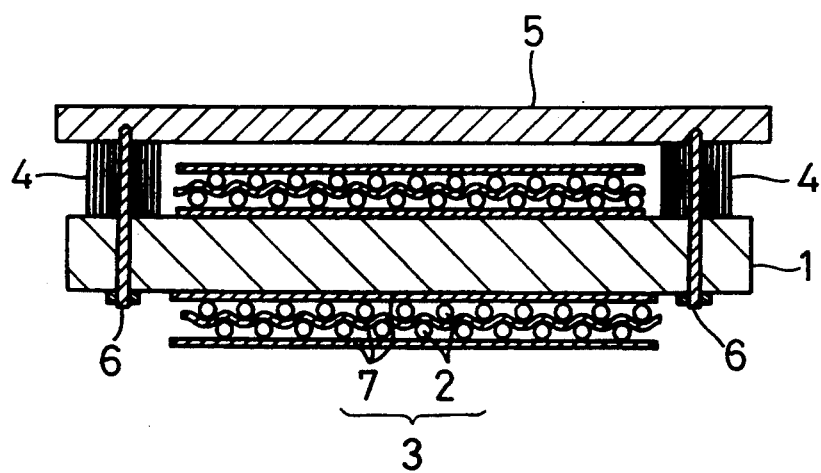
FIG. 2 shows a cross-sectional view taken in the line I—I of FIG. 1.
Figure 3:
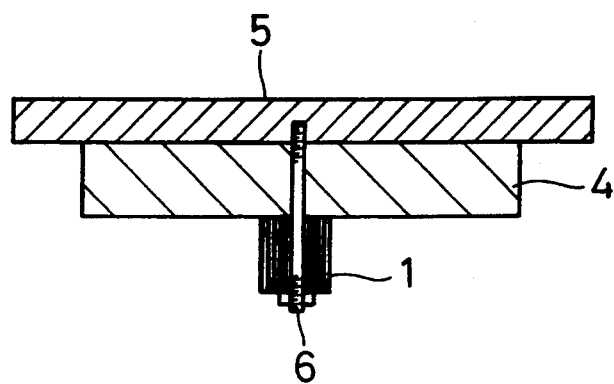
FIG. 3 shows a cross-sectional view taken in the line II—II of FIG. 1.

The invention is specifically described by referring to the figures. FIG. 1, FIG. 2, and FIG. 3 show an electromagnetic induction heater of an embodiment according to the invention. Assuming a transparent metal plate, FIG. 1 shows a perspective view of an electromagnetic induction heater. FIG. 2 shows a cross-sectional view taken in the line I—I of FIG. 1 and FIG. 3 shows a cross-sectional view taken in the line II—II of FIG. 1. An iron core 1 generates and passes a magnetic flux, and electric wire 2 transmits a low-frequency alternating current. Coil 3 is wrapped with aluminum wire 2, and magnetic flux diffusing member 4 diffuses the magnetic flux provided by the iron core 1. A metal plate 5 is heated by Joule heat. A bolt 6 binds iron core 1, magnetic flux diffusing member 4 and metal plate 5 together. 29 is a appliance coupling wire, and 30 is a plug. $W_1$ is the width of iron core 1, and $W_2$ is the length of magnetic flux diffusing member 4.

The interaction of electromagnetic induction heater is explained below.

By connecting aluminum wire 2 to a low-frequency alternating power source such as a commercial frequency alternating power source of 50 Hz or 60 Hz, electric power is provided to coil 3, and iron core 1 generates magnetic flux. The magnetic flux flows in magnetic flux diffusing member 4, diffusing the flux in a longitudinal direction. Namely, the magnetic flux is diffused by spreading from dimension ($W_1$) of iron core 1 to dimension ($W_2$) of magnetic flux diffusing member 4. The diffused magnetic flux enters metal plate 5, thereby heating the plate by Joule heat. Since the magnetic flux flows in metal plate 5 in a diffused condition, the plate can be efficiently and uniformly heated in a horizontal direction. As a result, the entire plate can be heated. In other words, an electromagnetic induction heater of this invention is useful for cooking grilled meat, steaks, okonomiyaki (meat & vegetable pancake), chow mein, pancakes, hot dogs, hamburgers or the like. Particularly, an electromagnetic induction heater of this invention is useful in a restaurant which cooks a large amount of food at controlled temperatures.

It is preferable in this invention that in regard to the relation between the width ($W_1$) of iron core 1 and the length ($W_2$) of magnetic flux diffusing member 4, the $W_2$ is 2-10 times greater than $W_1$, particularly 3-7 times. However, when it is used for example to anneal machine parts or to heat a mantle member of bearing part, $W_2$ can be made up to 70 times larger than $W_1$.

An iron plate or a stainless steel plate (for instance, SUS 410) is used as metal plate 5. Flat-rolled silicon steel sheets or strips, or an amorphous alloy can be used for iron core 1. The iron core can be either a wound core or a laminated iron core. Similarly, flat rolled silicon steel sheets or strips, or an amorphous alloy is used for magnetic flux diffusing member 4.

It is preferable to attach a temperature detector (not shown in the figures) inside or on metal plate 5 to accurately control the temperature. For example, when using a platinum temperature detector, it is possible to control the temperature in the range of $\pm 1°$ C.

Another embodiment of the invention is explained below.

Figure 4:
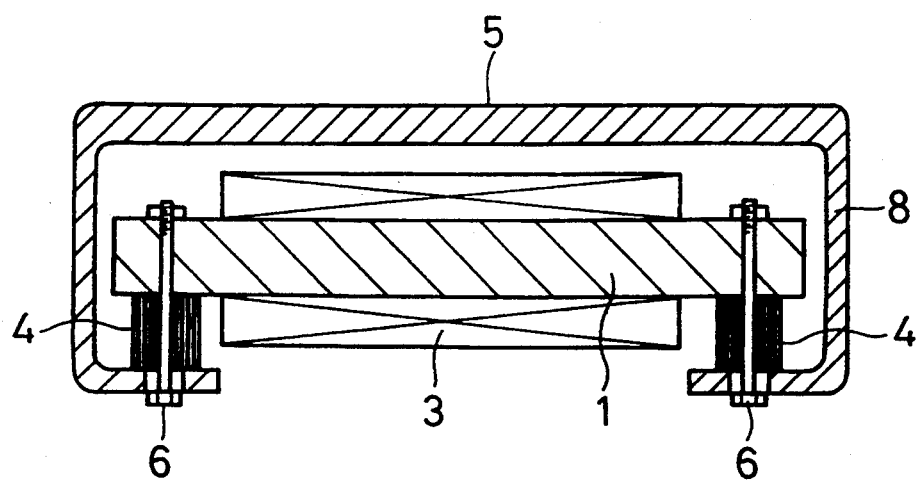
FIG. 4 shows a cross-sectional view of an electromagnetic induction heater of another embodiment of the invention in which the edges of an iron plate are bent into an L-shape.

FIG. 4 shows a cross-sectional view of an electromagnetic induction heater in which the edges of an iron plate are bent into an L-shape. By forming bent area 8, it is possible to attach magnetic flux diffusing member 4 to the area. As a result, the edges of metal plate 5, where flux leakage is likely to be generated, do not become a part of the heating surface. In other words, the magnetic attraction of metallic knives, forks, spatulas or the like to metal plate 5 can be eliminated.

FIG. 5 shows a cross-sectional view of another embodiment of an electromagnetic induction heater of this invention. A short-circuit member 9 is disposed on the bottom of metal plate 5 to absorb flux leakage. Electrically conductive materials such as a copper, aluminum or brass plate, 1–600 mm wide and 1–10 mm thick, .can be used for short-circuit member 9. Short-circuit electric current flows through a loop circuit composed of short-circuit member 9 and metal plate 5. There is little or no heat generated at short-circuit member 9, which is made of an electrically conductive material. Joule heat is generated by the flux of short-circuit electric current at metal plate 5. Joule heat generated by the inflow of magnetic flux to iron core 1 is combined with the joule heat generated by the flux of short-circuit electric current to efficiently generate heat at metal plate 5.

FIG. 6 shows a cross-sectional view of another embodiment of an electromagnetic induction heater of this invention. The metal plate is shaped like a container 10. As a result, the electromagnetic induction heater can be used as a pan for cooking oden (Japanese dish containing many kinds of ingredients in a broth), curry or the like. Or alternatively, another container can be placed inside the container-shaped metal plate and heated.

Figure 7:
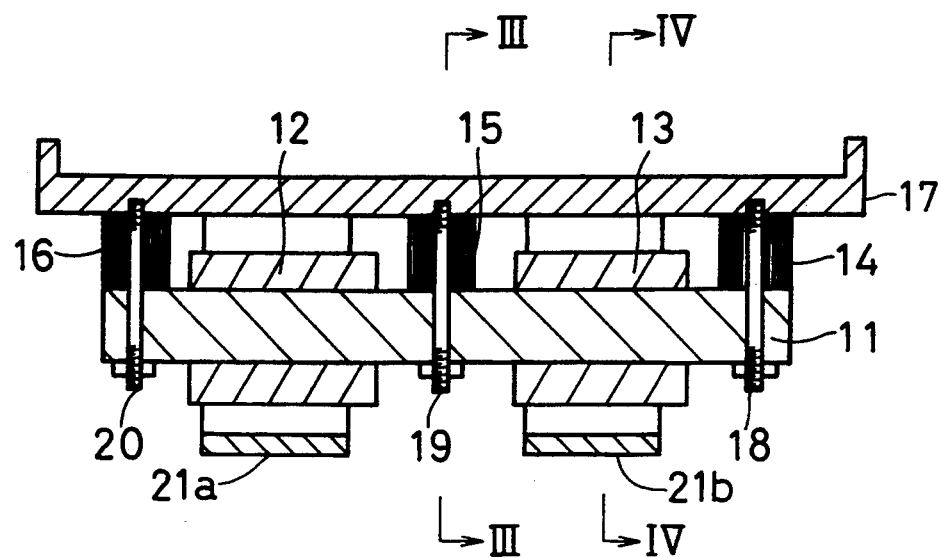
FIG. 7 shows a cross-sectional view of an electromagnetic induction heater of another embodiment of the invention using two coils.
Figure 8:
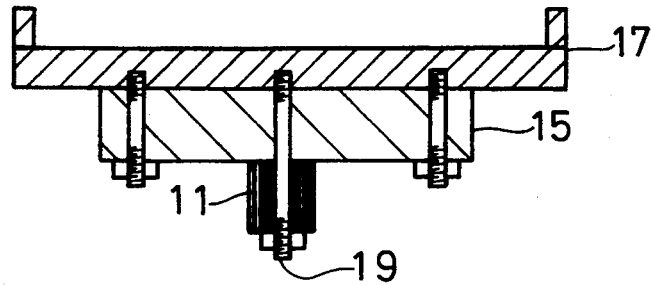
FIG. 8 shows a cross-sectional view taken in the line III—III of FIG. 7.
Figure 9:
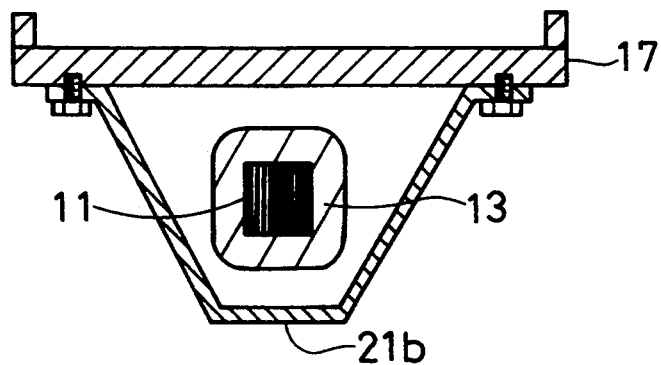
FIG. 9 shows a cross-sectional view taken in the line IV—IV of FIG. 7.

FIG. 7 shows a cross-sectional view of another embodiment of an electromagnetic induction heater of this invention. FIG. 8 shows a cross-sectional view taken in the line III—III of FIG. 7. FIG. 9 shows a cross-sectional view taken in the line IV—IV of FIG. 7. In FIG. 7, FIG. 8, and FIG. 9, the heater has two coils around iron core 11, coil 12, and coil 13. Magnetic flux diffusing members 14, 15 and 16 are fixed to the center and both ends of iron core 11 by bolts 18, 19 and 20. Therefore, magnetic flux generated at coil 12 passes through a magnetic circuit comprised of magnetic flux diffusing member 15, metal plate 17, and magnetic flux diffusing member 16. Magnetic flux generated at coil 13 passes through a magnetic circuit comprised of magnetic flux diffusing member 14, metal plate 17, and magnetic flux diffusing member 15. As a result, magnetic flux is diffused efficiently. In an electromagnetic induction heater comprising at least two coils as shown in FIG. 7, a Scott connection can be assembled by using a three-phase power source so that electric power is supplied equally from each phase of the power source. As a result, the cost of the heater can be reduced.

In FIG. 7, short-circuit members 21a and 21b (made of electrically conductive materials such as a copper plate 6 mm thick and 100 mm wide) are fixed to the metal plate and cover coils 12 and 13. As a result, flux leakage can be efficiently absorbed, preventing the generation of vibration and noise.

Short-circuit electric current flows in a loop circuit, comprised of short-circuit member 21b and metal plate 17 of FIG. 9, disposed at right angles to the longitudinal direction of iron core 11. There is little heat generated since short-circuit members 21a and 21b are made of electrically conductive materials. Joule heat is generated by the flux of short-circuit electric current to metal plate 17. Joule heat generated by the inflow of magnetic flux to the iron core is combined with the joule heat generated by the flux of short-circuit electric current to efficiently generate heat at metal plate 17.

Moreover, when heating metal plate 17, it is preferable to maintain the temperature of short-circuit members 21a and 21b which radiate conducted heat.

Figure 10:
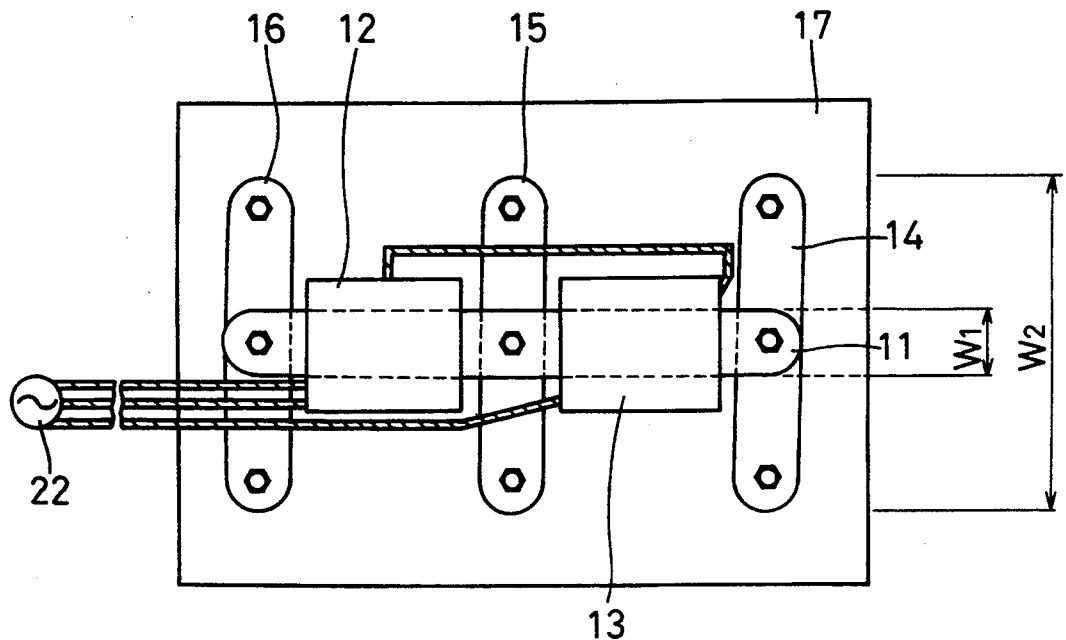
FIG. 10 shows a bottom view of an electromagnetic induction heater of another embodiment of this invention in which a Scott connection is applied by using a three-phase power source.
Figure 11:
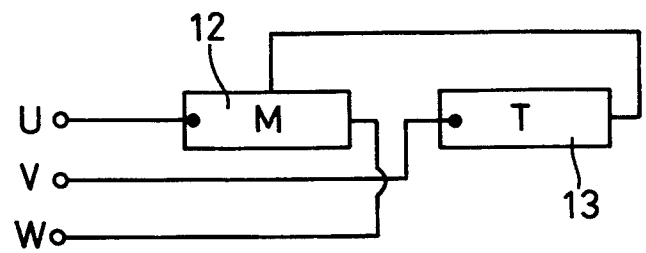
FIG. 11 shows a connection diagram of the Scott connection shown in FIG. 10.

FIG. 10 shows a bottom view of an electromagnetic induction heater of this invention in which a Scott connection is applied by using a three-phase power source. FIG. 11 shows a connection diagram of the Scott connection. An electric wire is connected to the U-phase of power source 22, and the electric wire is coiled up from the black point on the left side of FIG. 10 to form coil 12 (M seat). An electric wire connected to the V-phase of power source 22 is coiled up from another black point on the right side of FIG. 10 to form coil 13 (T seat). The electric wire coming out of coil 13 is connected to the middle point of coil 12. The electric wire coming out of coil 12 is then connected to the W-phase of power source 22 to form the Scott connection.

Figure 12:
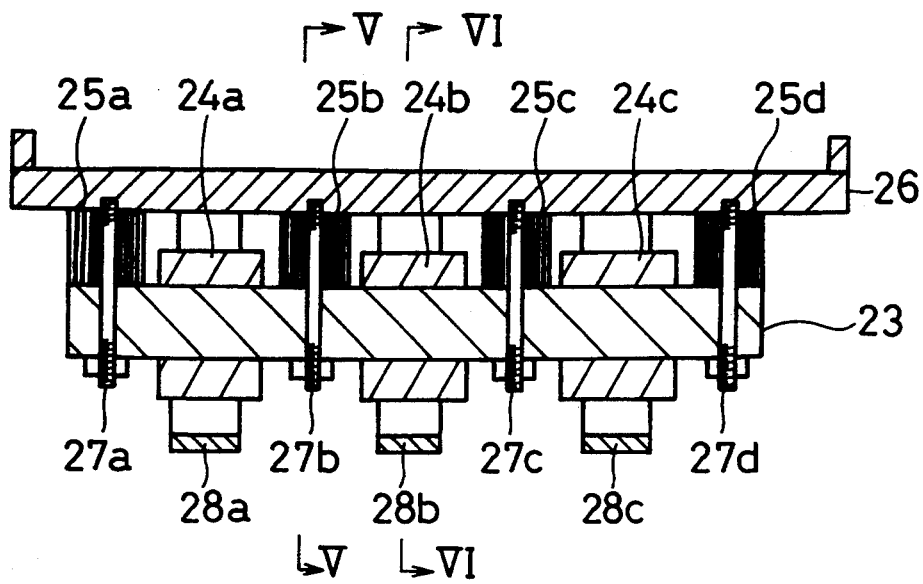
FIG. 12 shows a cross-sectional view of an electromagnetic induction heater of another embodiment of the invention using three coils.
Figure 13:
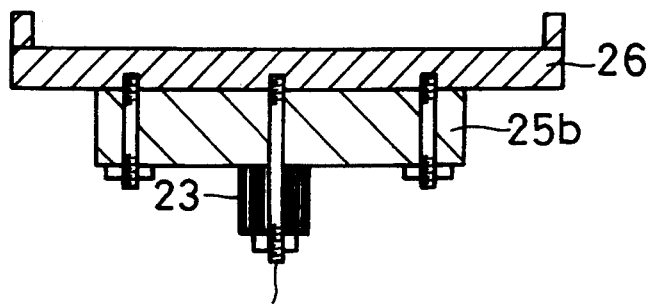
FIG. 13 shows a cross-sectional view taken in the line V—V of FIG. 12.
Figure 14:
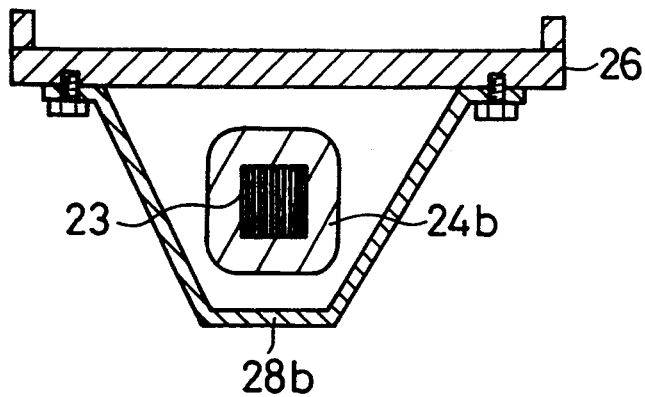
FIG. 14 shows a cross-sectional view taken in the line VI—VI of FIG. 12.

FIG. 12 shows a-cross sectional view of another embodiment of an electromagnetic induction heater of this invention. FIG. 13 shows a cross-sectional view taken in the line V—V of FIG. 12. FIG. 14 shows a cross sectional view taken in the line VI—VI of FIG. 12. As shown in FIG. 12, FIG. 13, and FIG. 14, coils 24a, 24b and 24c are formed around iron core 23. Each of the magnetic flux diffusing members 25a, 25b, 25c and 25d are fixed to both ends and two central sections of an iron core 23 via bolts 27a, 27b, 27c and 27d. As a result, magnetic flux generated at coil 24a flows to a magnetic circuit comprised of magnetic flux diffusing member 25a, metal plate 26, and magnetic flux diffusing member 25b; magnetic flux generated at coil 24b flows to a magnetic circuit comprised of magnetic flux diffusing member 25b, metal plate 26, and magnetic flux diffusing member 25c; magnetic flux generated at coil 24c flows to a magnetic circuit comprised of magnetic flux diffusing member 25c, metal plate 26, and magnetic flux diffusing member 25d. Thus, magnetic flux is efficiently diffused. By applying a three-phase electric power source, a delta connection or a star connection can be assembled so that electric power is equally consumed from each phase of the electric power source and the cost of the heater is reduced.

In FIG. 12 and FIG. 14, short-circuit members 28a, 28b and 28c (made of electrically conductive materials such as a copper plate 6 mm thick and 100 mm wide) are fixed to the metal plate and cover coils 24a, 24b and 24c. As a result, flux leakage is efficiently absorbed, preventing the generation of vibration and noise.

Short-circuit electric current flows to a loop circuit comprised of short-circuit member 28b and metal plate 26 of FIG. 14 in a direction which runs at right angles to the longitudinal direction (the direction of magnetic flux) of common iron core 23. There is little heat generated since the short-circuit member is made of electrically conductive materials. Joule heat is generated by the flux of short-circuit electric current to the metal plate. Joule heat generated by the inflow of magnetic flux to the iron core is combined with the joule heat generated by the flux of short-circuit electric current to efficiently generate heat at the metal plate.

Figure 15:
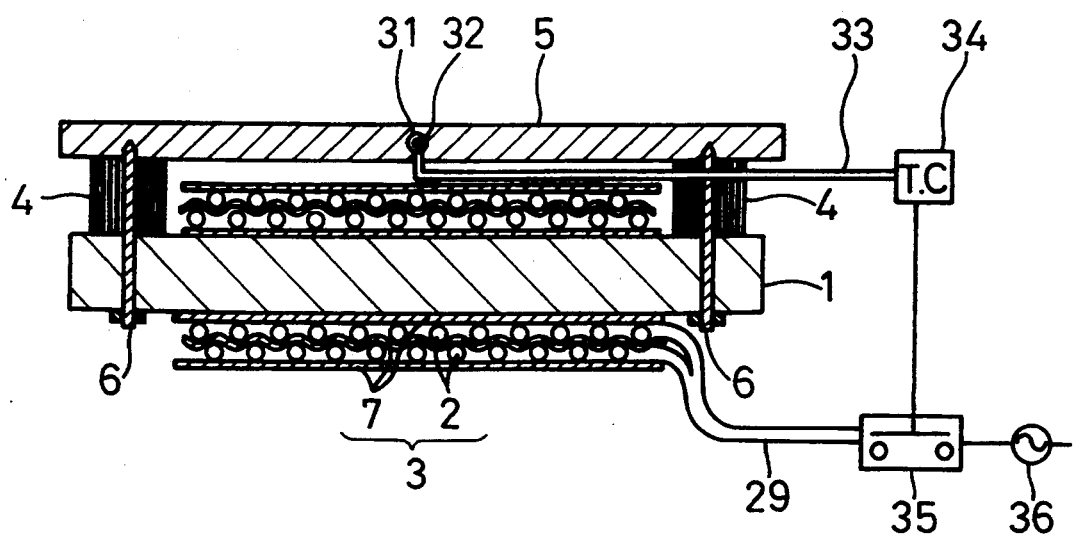
FIG. 15 is a schematic illustration of a temperature control of an embodiment of the invention.

FIG. 15 is a schematic illustration of a temperature control of an embodiment of this invention. A hole 31 is provided in the central part of metal plate 5, and thermocouple 32 is inserted into hole 31. A temperature sensing wire 33, joined to thermocouple 32, is connected to temperature controller (TC) 34. Both the signal wire from temperature controller 34 and power supply cord 29 are connected to magnetic switch 35. Therefore, when the temperature of metal plate 5 is higher than the set temperature, the connection to power source 36 is disconnected and electric current no longer flows to the coil. On the other hand, when the temperature of metal plate 5 is below the set temperature, the connection to power source 36 remains on and electric current flows to the coil.

Figure 16:
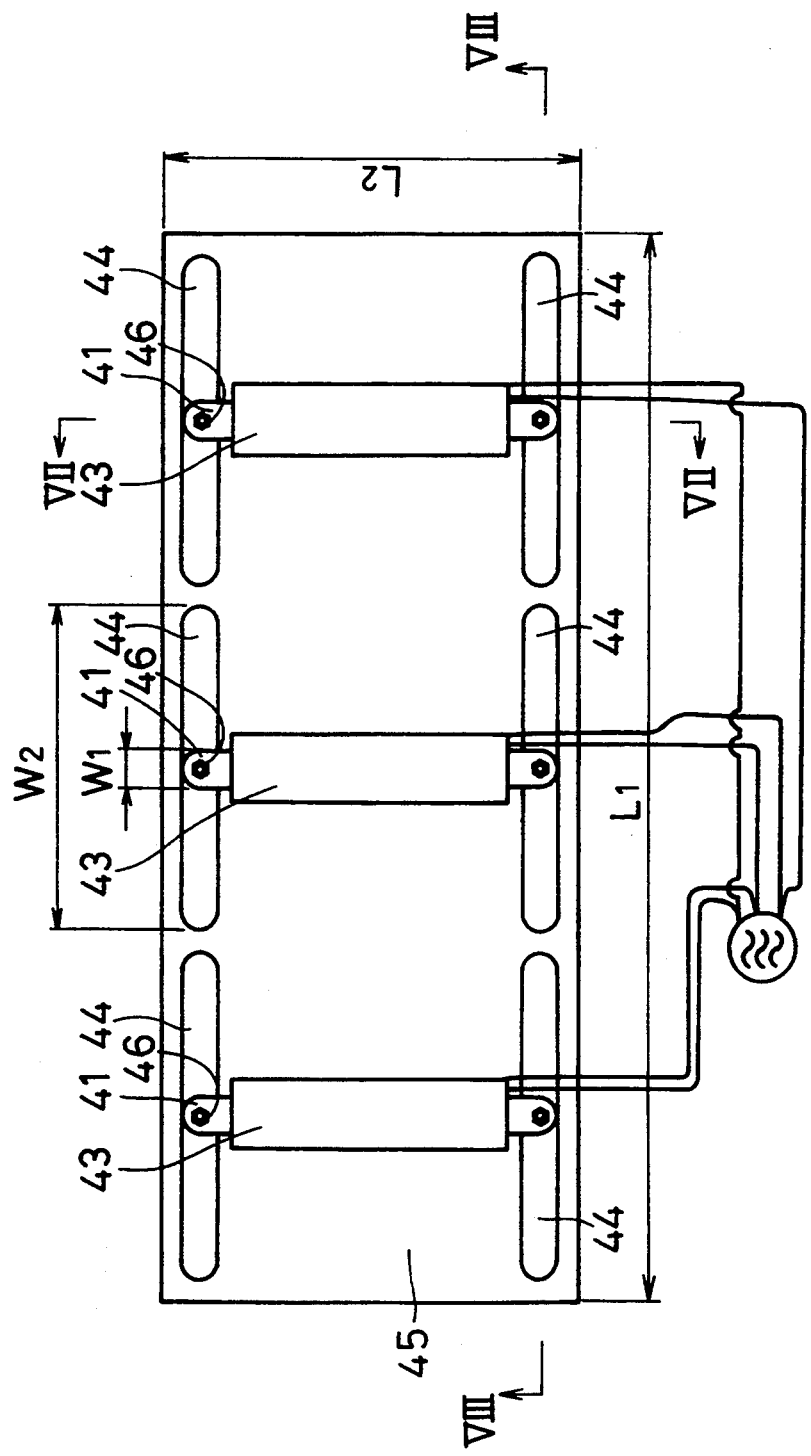
FIG. 16 shows a rear view of an electromagnetic induction heater of an another embodiment of this invention in which 3 units consisting of an iron core, coils and magnetic flux diffusing members are attached to a metal plate in a row.
Figure 17:
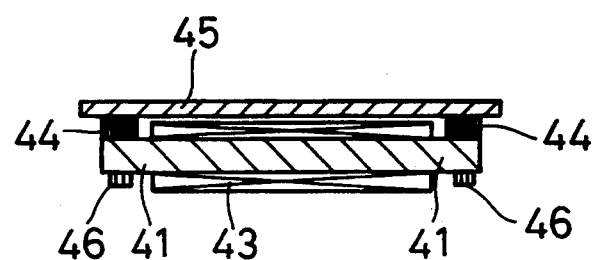
FIG. 17 shows a cross-sectional view taken in the line VII—VII of FIG. 16.
Figure 18:
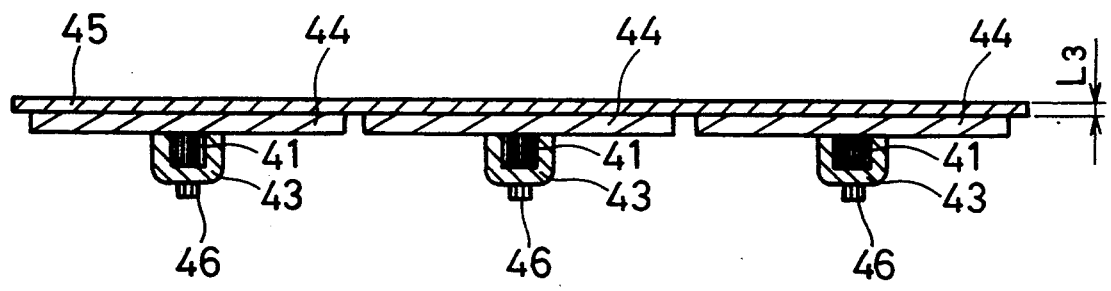
FIG. 18 shows a cross-sectional view taken in the line VII-VIII of FIG. 16.

FIG. 16, 17 and 18 show 3 pieces of a unit comprising iron core 41, coil 43 and 2 magnetic flux diffusing members 44 arranged in a row. At the same time, they are connected to metal plate 45 in such a way that said iron cores 41 are practically parallel. Therefore, it shows that electric wires of coil 43 constructing one unit are connected to a three-phase power source. 46 is a bolt. As a result, a three-phase electric power is consumed equally from each phase of the power source. Thus, a wide metal plate can be heated uniformly. FIG. 17 shows a cross-sectional view taken in the line VII—VII of FIG. 16. FIG. 18 shows a cross-sectional view taken in the line VIII—VIII of FIG. 16.

Figure 19:
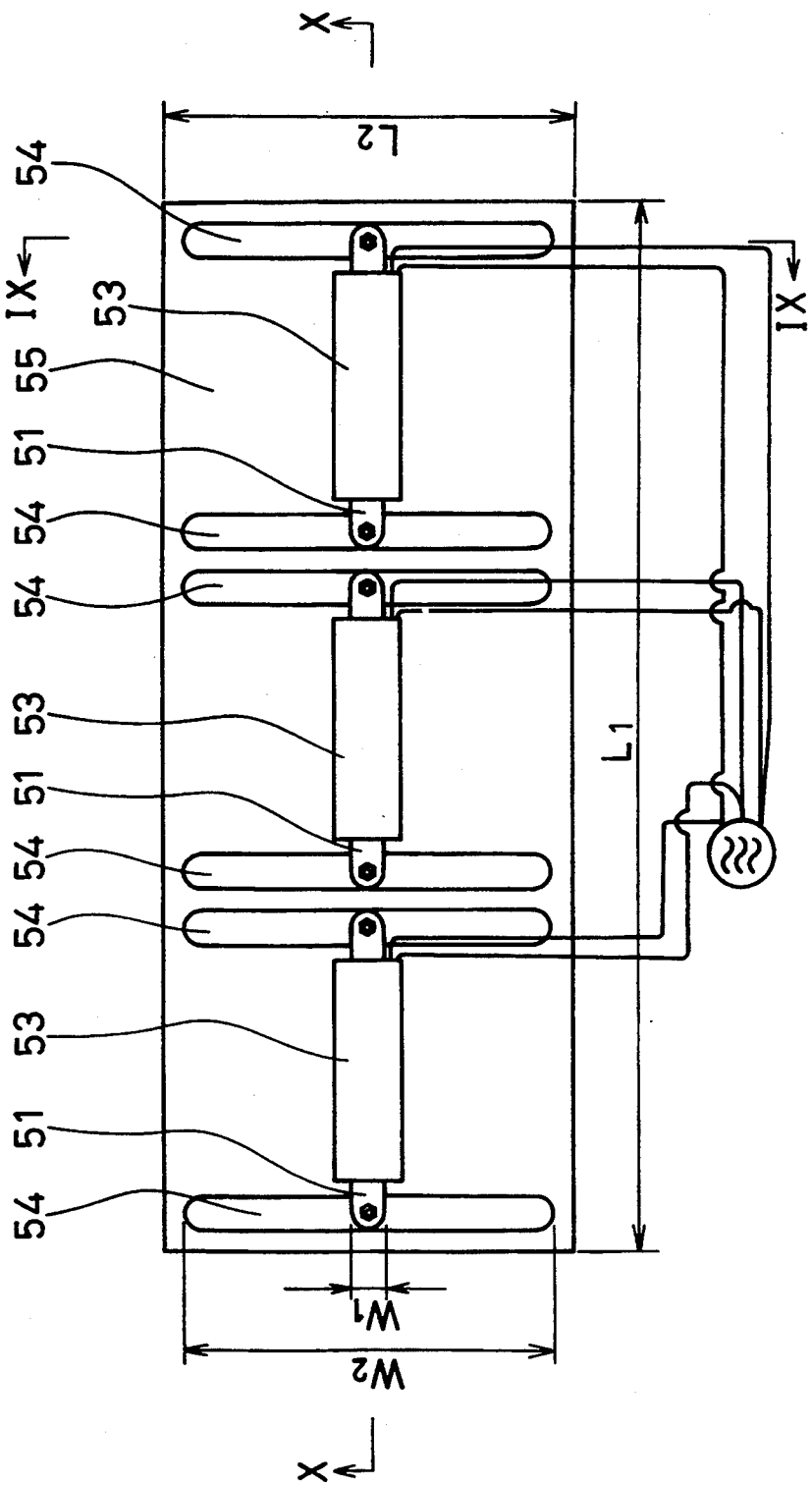
FIG. 19 shows a rear view of an electromagnetic induction heater of an another embodiment of this invention in which 3 units consisting of an iron core, coils and magnetic flux diffusing members are attached to a metal plate vertically.
Figure 20:
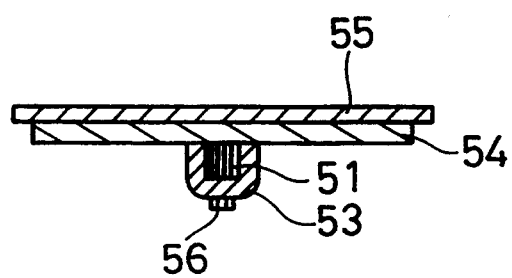
FIG. 20 shows a cross-sectional view taken in the line IX—IX of FIG. 19.
Figure 21:
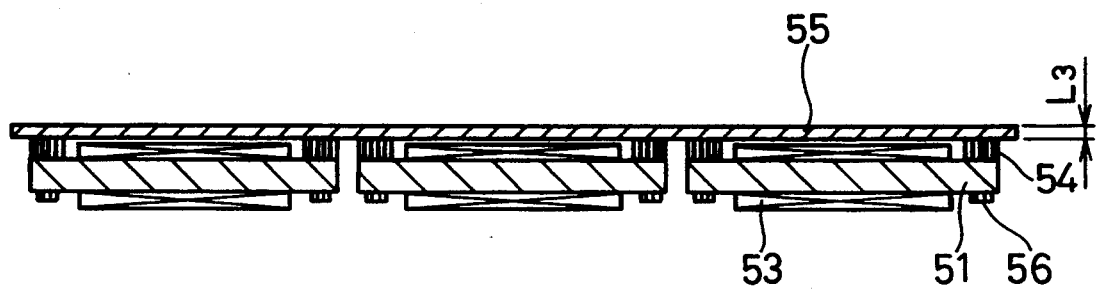
FIG. 21 shows a cross-sectional view taken in the line X—X of FIG. 19.

FIG. 19, 20 and 21 show 3 pieces of one unit comprising iron core 51, coil 52 and 2 magnetic flux diffusing members arranged vertically. At the same time, they are connected to metal plate 55, while the wire of coil 53 constructing the said unit is connected to a three-phase power source. 56 is a bolt. As a result, three-phase power source electricity can be consumed equally and, a wide area can be heated uniformly.

FIG. 20 shows a cross-sectional view taken in the line IX—IX of FIG. 19, and FIG. 21 shows a cross-sectional view taken in the line X—X of FIG. 19.

As explained above, an electromagnetic induction heater of this invention can heat a wide area uniformly and efficiently by fixing magnetic flux diffusing members to at least both ends of an iron core wrapped with an electric wire which forms a coil, and by connecting a metal plate to the magnetic flux diffusing members. More specifically, a magnetic flux is generated in the coil, and the flux is diffused in a longitudinal direction of the metal plate by the magnetic flux diffusing members. Diffused magnetic flux flows in the metal plate to generate Joule heat and heat a wide area of the plate uniformly.

The invention will be further explained in the following examples.

Example 1

A wound iron core was prepared by the following procedure:
 winding a silicon steel plate with a thickness of 0.35 mm;
 impregnating the silicon steel plate with thermosetting polyimide-based adhesive; and
 heating the silicon steel plate.

As shown in FIG. 1, FIG. 2, and FIG. 3, an electromagnetic induction heater was assembled. An iron plate, 8 mm thick, 400 mm wide and 600 mm long, was used for the electromagnetic induction heater. The temperature of the iron plate was raised to 180°–200° C. by supplying a single-phase electric power at 60 Hz with 2 kW to aluminum wire 2 (3.2 mm in diameter) for about 10 minutes, and the entire plate was uniformly heated. Therefore, an okonomiyaki (meat & vegetable pancake) was evenly cooked by the heater of the example. A temperature detector was fixed to the iron plate to maintain a temperature in the range of 180°-200° C. A steak was also evenly and well baked. The dimensions of this example are shown in the following Table 1.

TABLE 1

|  | width(mm) | height(mm) | length(mm) |
|---|---|---|---|
| Iron core | 54 | 44 | 501 |
| Outside two diffusing members | 54 | 35 | 274 |
| Iron plate | 400 | 8 (thickness) | 600 |

The relation between the width ($W_1$) of iron core 1 and the length ($W_2$) of magnetic flux diffusing member 4 was $W_1=54$ mm and $W_2=274$ mm. Therefore, $W_2/W_1=5.07$, and the magnetic flux was diffused 5.07 times.

Example 2

A wound iron core was prepared by the following procedure:
 winding a silicon steel plate with a thickness of 0.35 mm;
 impregnating the steel plate with thermosetting polyimide-based adhesive; and
 heating the silicone steel plate.

An electromagnetic induction heater was assembled as shown in FIG. 7, FIG. 8, FIG. 9, and FIG. 10. The dimensions of this example are shown in the following Table 2.

TABLE 2

|  | width(mm) | height(mm) | length(mm) |
|---|---|---|---|
| Iron core | 54 | 44 | 501 |
| Outside two diffusing members | 54 | 35 | 274 |
| Center diffusing member | 54 | 35 | 158 |
| Iron plate | 380 | 20 (thickness) | 600 |

The relation between the width ($W_1$) of iron core 1 and the length ($W_2$) of magnetic flux diffusing member 4 : $W_1=54$ mm, $W_2=274$ mm. Therefore, $W_2/W_1=5.07$, and the magnetic flux was diffused 5.07 times.

A electric power was provided to the heater through a coil comprised of alunimum wire (2.6 mm in diameter) for about 20 minutes by supplying 200 V of a three-phase alternating electric power at 60 Hz with 2.86 kW from power source 22. As a result, the temperature of the iron plate was raised to 180°-200° C. The iron plate was heated uniformly. Therefore, an okonomiyaki was cooked evenly. A temperature detector was fixed to the iron plate to maintain a temperature in the range of 180°-200° C. A steak was also evenly and well baked. A Scott connection of the example provided 13.64 A alternating current from U-phase (input current unbalanced ratio=i.c.u.r.: 109.6%), 11.41 A from V-phase (i.c.u.r.: 91.7%) and 12.27 A (i.c.u.r.: 98.6%) from W-phase. The iron plate of the example was heated by a balanced and practical connection.

Example 3

A wound iron core was prepared by the following procedure:
 winding a silicon steel plate with a thickness of 0.35 mm;
 impregnating the steel plate with thermosetting polyimide-based adhesive; and
 heating the silicone steel plate.

An electromagnetic induction heater was assembled as shown in FIG. 16, FIG. 17 and FIG. 18. An iron plate, 1500 mm long ($L_1$ of FIG. 16), 600 mm wide ($L_2$ of FIG. 16) and 20 mm thick ($L_3$ of FIG. 18), was used for the electromagnetic induction heater.

A electric power was provided to the heater through a coil 43 comprised of alunimum wire (3.2 mm in diameter) for about 60 minutes by supplying 200 V of a three-phase alternating electric power at 60 Hz with 3.9 kW. As a result, the temperature of the iron plate was raised to 180°-200° C. The iron plate was heated uniformly. A crepe was cooked evenly. A temperature detector was fixed to the iron plate to maintain a temperature in the range of 180°-200° C. The dimensions of this example are shown in the following Table 3.

TABLE 3

|  | width(mm) | height(mm) | length(mm) |
|---|---|---|---|
| Iron core | 50 | 44 | 500 |
| Outside two diffusing members | 50 | 35 | 460 |
| Iron plate | 600 | 20 (thickness) | 1500 |

The relation between the width ($W_1$) of iron core 41 and the length ($W_2$) of magnetic flux diffusing member 44 was $W_1=50$ mm and $W_2=460$ mm. Therefore, $W_2/W_1=9.2$, and the magnetic flux was diffused 9.2 times.

Example 4

A wound iron core was prepared by the following procedure:
 winding a silicon steel plate with a thickness of 0.35 mm;
 impregnating the steel plate with thermosetting polyimide-based adhesive; and
 heating the silicone steel plate.

An electromagnetic induction heater was assembled as shown in FIG. 19, FIG. 20 and FIG. 21. An iron plate, 1500 mm long ($L_1$ of FIG. 19), 600 mm wide ($L_2$ of FIG. 19) and 20 mm thick ($L_3$ of FIG. 21), was used for the electromagnetic induction heater.

A electric power was provided to the heater through a coil 53 comprising of alunimum wire (3.2 mm in diameter) for about 60 minutes by supplying 200 V of a three-phase alternating electric power at 60 Hz with 3.9 kW. As a result, the temperature of the iron plate was raised to 180°-200° C. The iron plate was heated uniformly. A crepe was cooked evenly. A temperature detector was fixed to the iron plate to maintain a temperature in the range of 180°-200° C. The dimensions of this example are shown in the following Table 4.

TABLE 4

|  | width(mm) | height(mm) | length(mm) |
|---|---|---|---|
| Iron core | 50 | 44 | 460 |
| Outside two diffusing members | 50 | 35 | 540 |

TABLE 4-continued

|  | width(mm) | height(mm) | length(mm) |
|---|---|---|---|
| Iron plate | 600 | 20 (thickness) | 1500 |

The relation between the width ($W_1$) of iron core 1 and the length ($W_2$) of magnetic flux diffusing member 4 was $W_1=50$ mm and $W_2=540$ mm. Therefore, $W_2/W_1=10.8$, and the magnetic flux was diffused 10.8 times.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

We claim:

1. An electromagnetic induction heater comprising an iron core of a transverse dimension $W_1$ and having a longitudinal axis, ends and a central part, said iron core being wrapped with an electric wire to form a coil around said core, said ends of said iron core each being fixed to elongated magnetic flux diffusing members having longitudinal axes disposed substantially perpendicularly to the longitudinal axis of said iron core, said magnetic flux diffusing members being connected to a metal plate and each having length $W_2$ which is greater than said transverse dimension $W_1$ of said iron core, wherein a magnetic flux flows through a closed magnetic circuit comprising said iron core, said magnetic flux diffusing members and said metal plates by connecting said electric wire to a low frequency alternating current power source, the magnetic flux being diffused by spreading from dimension $W_1$ to length $W_2$, so that said metal plate is heated by Joule heat, and wherein a ratio of said length $W_2$ to said transverse dimension $W_1$ is between 2 and 70.

2. The electromagnetic induction heater according to claim 1, wherein said ratio of said length $W_2$ to said transverse dimension $W_1$ is between 3 to 7.

3. The electromagnetic induction heater according to claim 1, wherein said ratio of said length $W_2$ to said transverse dimension $W_1$ is 5.

4. The electromagnetic induction heater according to claim 1, wherein a plurality of units, comprised of an iron core, coils and magnetic flux diffusing members, are arranged in a row, said iron cores are substantially parallel, and said units are attached to a metal plate.

5. The electromagnetic induction heater according to claim 1, wherein a plurality of units, comprised of an iron core, coils and magnetic flux diffusing members are arranged vertically.

6. The electromagnetic induction heater according to claim 1, comprising three units.

7. The electromagnetic induction heater according to claim 6, wherein said coils of said units are connected to a three-phase power source.

8. The electromagnetic induction heater according to claim 1, wherein said electirc wire is an aluminum wire.

9. The electromagnetic induction heater according to claim 1, wherein said metal plate is an iron plate.

10. The electromagnetic induction heater according to claim 1, wherein said iron core and said magnetic flux diffusing members are made of flat rolled silicon steel sheets or strips.

11. The electromagnetic induction heater according to claim 1, wherein a temperature detector is disposed inside said metal plate.

12. The electromagnetic induction heater according to claim 1, wherein edges of said metal plate are bent into an L-shape, and wherein said magnetic flux diffusing members are fixed to the bent edges of said metal plate.

13. The electromagnetic induction heater according to claim 1, wherein a flux leakage absorbing member is fixed to said bottom of said metal plate.

14. The electromagnetic induction heater according to claim 13, wherein said flux leakage absorbing member is a short-circuit member made of an electrically conductive material.

15. The electromagnetic induction heater according to claim 1, wherein said magnetic flux diffusing members are disposed at right angles to said iron core.

16. The electromagnetic induction heater according to claim 1, wherein said metal plate is selected from the group consisting of a flat plate, a concave plate, and a container.

17. The electromagnetic induction heater according to claim 1, wherein said magnetic flux diffusing members are fixed to two ends and said central part of said iron core.

18. The electromagnetic induction heater according to claim 17, having two coils.

19. The electromagnetic induction heater according to claim 18, wherein the connection of said electric wire of said coils is a three-phase Scott connection.

20. The electromagnetic induction heater according to claim 1, wherein ends and two central sections of said central part of said iron core have at least three coils wrapped therearound, and wherein three-phase electric power is supplied to said electric wire of said coils.

* * * * *